US009151966B1

(12) United States Patent
 Gerlovich et al.

(10) Patent No.: US 9,151,966 B1
(45) Date of Patent: Oct. 6, 2015

(54) PRESCRIPTION EYEWEAR ASSEMBLY

(71) Applicant: Wiley X, Inc., Livermore, CA (US)

(72) Inventors: Steven A. Gerlovich, Livermore, CA (US); Daniel W. Freeman, Pleasanton, CA (US)

(73) Assignee: Wiley X, Inc., Livermore, CA (US)

( * ) Notice: Subject to any disclaimer, the term of this patent is extended or adjusted under 35 U.S.C. 154(b) by 0 days.

(21) Appl. No.: 14/256,245

(22) Filed: Apr. 18, 2014

(51) Int. Cl.
  *G02C 9/00* (2006.01)
  *G02C 5/02* (2006.01)
  *G02C 5/12* (2006.01)

(52) U.S. Cl.
  CPC .. *G02C 5/02* (2013.01); *G02C 5/12* (2013.01); *G02C 9/00* (2013.01)

(58) Field of Classification Search
  CPC .......... G02C 7/086; G02C 7/104; G02C 9/00; G02C 9/04
  USPC ........... 351/47, 57, 48, 58, 41, 136, 137, 138, 351/158
  See application file for complete search history.

(56) References Cited

U.S. PATENT DOCUMENTS

| 5,007,727 | A | * | 4/1991 | Kahaney et al. | 351/47 |
| 5,412,438 | A | | 5/1995 | Bolle' | |
| 5,790,230 | A | * | 8/1998 | Sved | 351/138 |
| 5,929,963 | A | * | 7/1999 | McNeal | 351/47 |
| 6,282,727 | B1 | | 9/2001 | Lindahl | |
| 6,386,703 | B1 | | 5/2002 | Huang | |
| 7,461,935 | B2 | * | 12/2008 | Collier et al. | 351/47 |
| 7,641,333 | B2 | * | 1/2010 | Blanshay et al. | 351/47 |
| 8,104,890 | B2 | | 1/2012 | Blanshay et al. | |
| 2011/0083256 | A1 | | 4/2011 | Wang-Lee | |

* cited by examiner

*Primary Examiner* — Hung Dang
(74) *Attorney, Agent, or Firm* — Haynes Beffel & Wolfeld LLP; James F. Hann

(57) ABSTRACT

A prescription eyewear assembly, for mounting to eyewear such as protective goggles, includes a connector, having front and rear portions, and a lens frame releasably securable to the connector. The front portion includes an eyewear connection element. The rear portion includes a clip having upwardly extending front and rear elements with opposed front and rear surfaces with a channel therebetween. The rear element defines an opening extending from the channel. The lens frame has first and second lens-receiving portions connected by a bridge. The bridge has a central portion and first and second support arms. The central portion includes an interlocking projection and is configured to fit within the channel of the clip with the interlocking projection releasably engaging the opening in the rear element. The central portion of the bridge can be positioned forward of the first and second lens-receiving portions.

17 Claims, 5 Drawing Sheets

PRESCRIPTION EYEWEAR ASSEMBLY

BACKGROUND

People use eyewear for a variety of reasons including enhancing their vision, protection from too much light and for physical protection. Eyewear for physical protection can be, for example, in the form of safety glasses, safety goggles and eye shields mounted to helmets or other structure. Members of the military often use protective eyewear during combat, as well as at other times. While some eyewear can be worn over conventional eyeglasses, at other times this is not possible because of, for example, the need to provide a tight seal between the eyewear the user's face.

SUMMARY

An example of a prescription eyewear assembly, for use with eyewear, includes a connector and a lens frame releasably securable to the connector. The connector includes a front portion and a rear portion. The front portion includes an eyewear connection element. The rear portion includes a clip having upwardly extending front and rear elements, the front and rear elements having opposed front and rear surfaces. The clip defines a laterally extending channel between the opposed front and rear surfaces. The rear element defines an opening formed therein, the opening extending from the channel in a rearward direction away from the front element. The lens frame has first and second lens-receiving portions connected by a bridge. The bridge has a central portion and first and second support arms connecting the central portion to the first and second lens-receiving portions. The central portion includes an interlocking projection. The central portion is configured to fit within the channel of the clip with the interlocking projection releasably engaging the opening in the rear element.

The prescription eyewear assembly can include one or more the following. The bridge can be an offset, generally U-shaped bridge. The central portion of the bridge can be positioned forward of the first and second lens-receiving portions. Prescription lenses can be mounted to the first and second lens-receiving portions. The opening and the interlocking projection can be sized and shaped to effectively prevent the interlocking projection from rotating within the opening.

Other features, aspects and advantages of implementations of this disclosure can be seen on review the drawings, the detailed description, and the claims which follow.

BRIEF DESCRIPTION OF THE DRAWINGS

FIG. 4A shows the lens frame in a horizontal position with the central portion of the bridge of the lens frame vertically aligned with the channel of the clip.

FIG. 4B shows the structure of FIG. 4A after the central portion of the bridge has been inserted downwardly into the channel of the clip.

FIG. 4C show the structure of FIG. 4B as the lens frame is rotated clockwise direction about the central portion of the bridge.

FIG. 4D shows the structure of FIG. 4C after continued rotation of the lens frame until the interlocking projection of the bridge has snapped into place within the opening in the rear element of the clip.

DESCRIPTION

Figure 1:
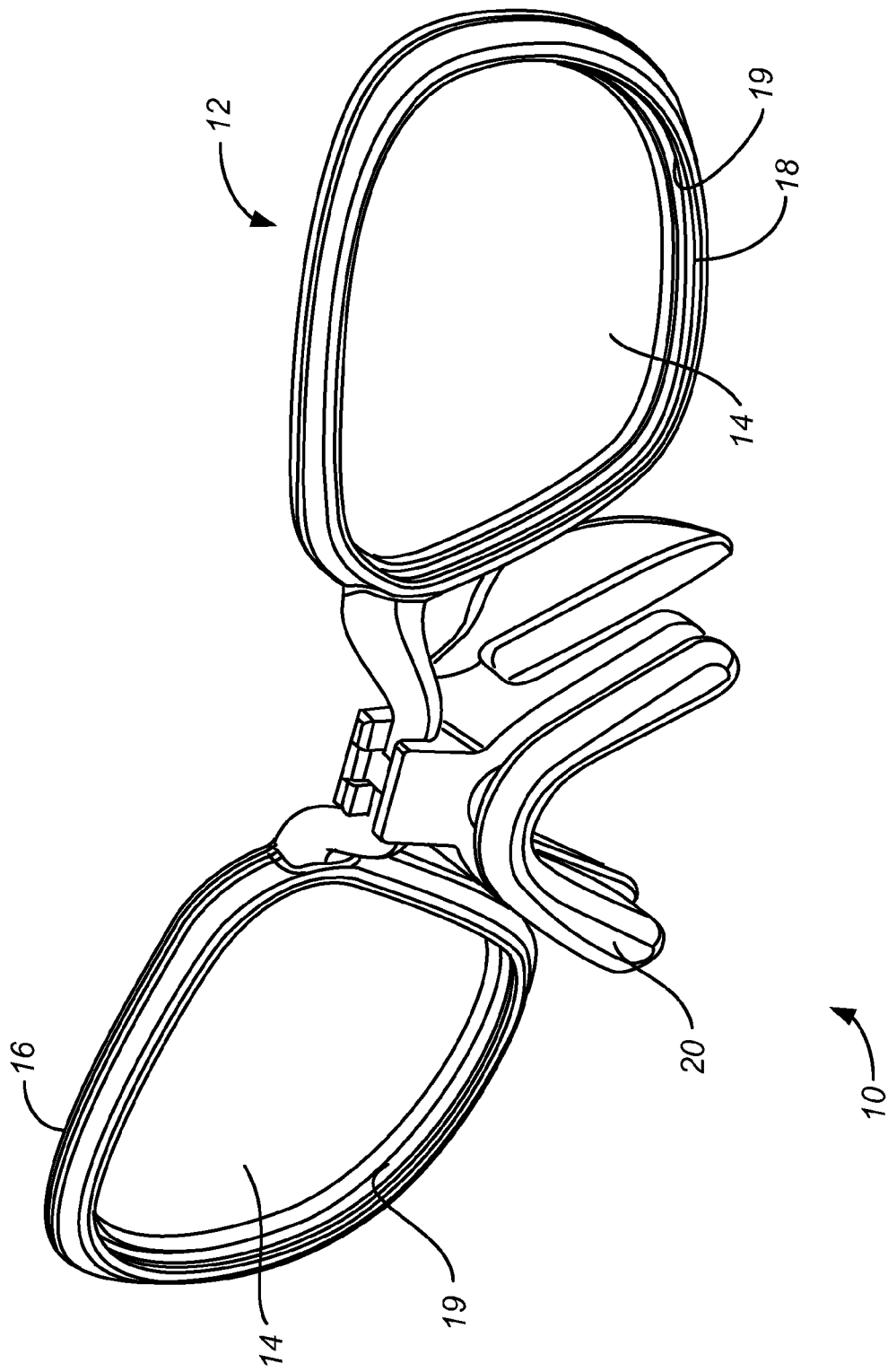
FIG. 1 is an overall view of one example of a prescription eyewear assembly including a lens frame, a prescription lens mounted within one or both of the lens-receiving portions of the lens frame, and a connector to which the lens frame is mounted.

The following description will typically be with reference to specific structural embodiments and methods. It is to be understood that there is no intention to be limited to the specifically disclosed embodiments and methods but that other features, elements, methods and embodiments may be used for implementations of this disclosure. Preferred embodiments are described to illustrate the technology disclosed, not to limit its scope, which is defined by the claims. Those of ordinary skill in the art will recognize a variety of equivalent variations on the description that follows. Unless otherwise stated, in this application specified relationships, such as parallel to, aligned with, or in the same plane as, mean that the specified relationships are within limitations of manufacturing processes and within manufacturing variations. When components are described as being coupled, connected, being in contact or contacting one another, they need not be physically directly touching one another unless specifically described as such. Like elements in various embodiments are commonly referred to with like reference numerals.

FIG. 1 is an overall view of one example of a prescription eyewear assembly 10, sometimes referred to as an RX assembly 10, including a lens frame 12, a prescription lens 14 mounted within one or both of the first and second lens-receiving portions 16, 18 of the lens frame. In the example of FIG. 1 prescription lenses 14 amounted within both of the lens receiving portion 16, 18. Lens-receiving portions 16, 18 have interior grooves 19 sized for receipt of the outer edges of lenses 14. Grooves 19 are defined by front and rear walls with the rear walls preferably being taller than the front walls to help prevent prescription lenses 14 from being dislodged from lens frame 12 towards the user's face during use. In some cases one or both prescription lenses 14 may not include refractive correction. Prescription lenses 14 are, in this application, intended to include lenses providing the one or more of refractive correction, light polarization, light attenuation (sunglasses, welding shields), UVA, UVB, UVC attenuation, as well as lens physical safety features.

Figure 2:
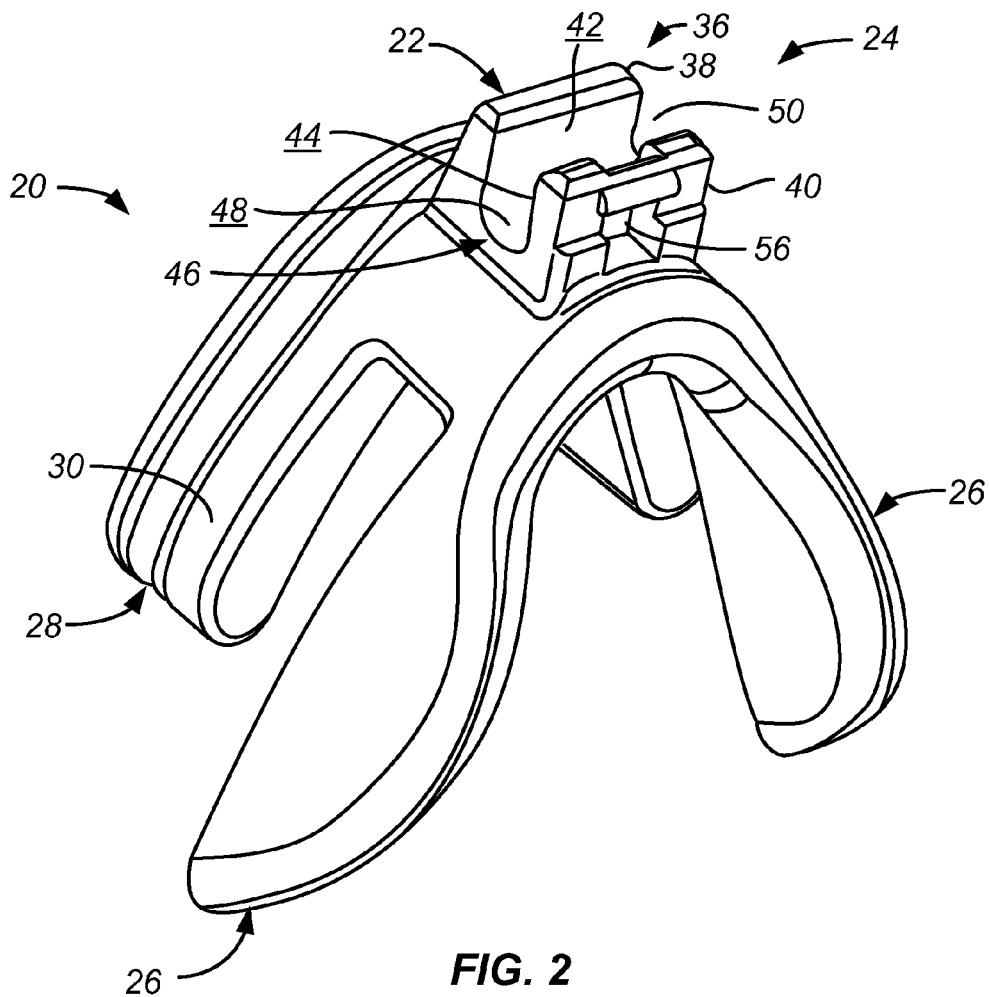
FIG. 2 is an overall view of the connector of FIG. 1 including a front portion, a rear portion and nose pads mounted to the rear portion.

Assembly 10 also includes a connector 20 to which the lens frame 12 is mounted. FIG. 2 is an overall view of connector 20 of FIG. 1 including a front portion 22, a rear portion 24 and nose pads 26 mounted to the rear portion. Nose pads 26 can be of generally conventional design. Nose pads 26, in this example, have cushioned surfaces and are bendable for an appropriate fit on the bridge of the user's nose. I Front portion 22 includes an eyewear connection element 28. In this example eyewear connection element 28 includes a groove 30 sized and configured to be secured to the central bridge portion 32 of eyewear 34 as shown in FIG. 5. Eyewear 34 in the example of FIG. 4 are protective goggles; eyewear 34 can include other types of eyewear including, for example, night vision goggles, helmet visors, and gas masks. Although eyewear connection element 28 is typically designed to fit to the central bridge portion of eyewear, it can be designed for fitting to other structural elements of the eyewear.

Figure 2A:
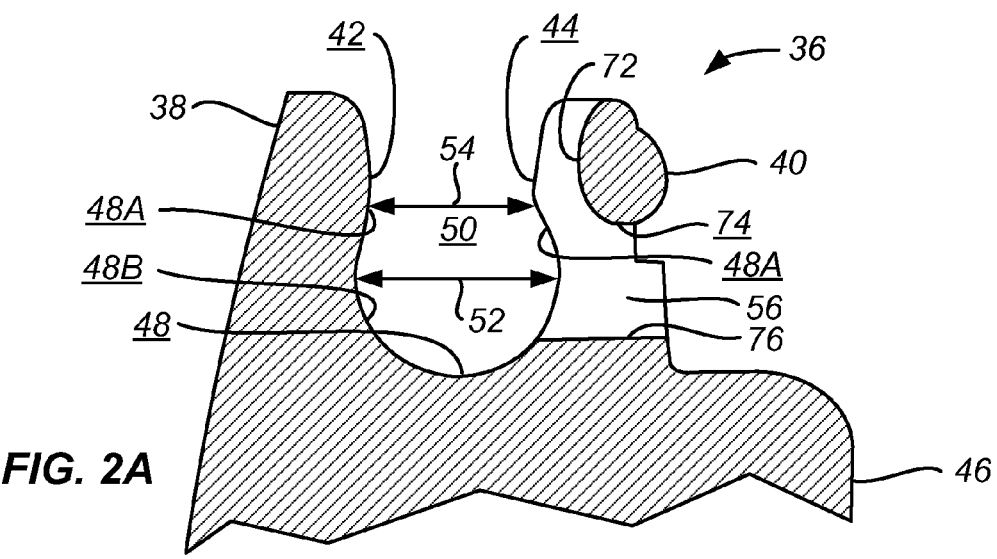
FIG. 2A is an enlarged cross-sectional view of the clip of the rear portion of the connector of FIG. 2.

Rear portion 24 includes a clip 36. Clip 36, shown in cross-section in in FIG. 2A, has upwardly extending front and rear elements 38, 40. Front and rear elements 38, 40 have opposed front and rear surfaces 42, 44. Clip 36 also has a base portion 46 having a base surface 48 extending to the opposed front and rear surfaces 42, 44. The base surface 48 and the opposed front and rear surfaces 42, 44 define a laterally extending channel 50. Base surface 48 has an upper portion 48A, joining front and rear surfaces 42, 44, and a central portion 48B. The front to rear dimension 52 of base surface 48 at the central portion 48B is larger than the front to rear dimension 54 of the base surface where upper portion 48A meets front and rear surfaces 42, 44. As will be discussed below, this helps maintain lens frame 12 secured to connector 20.

Rear element 40 defines an opening 56 extending from channel 50 in a rearward direction away from front element 38. In this example opening 56 is a through hole extending completely through rear element 40. In some examples opening 56 need not extend completely through rear element 40.

Figure 3:
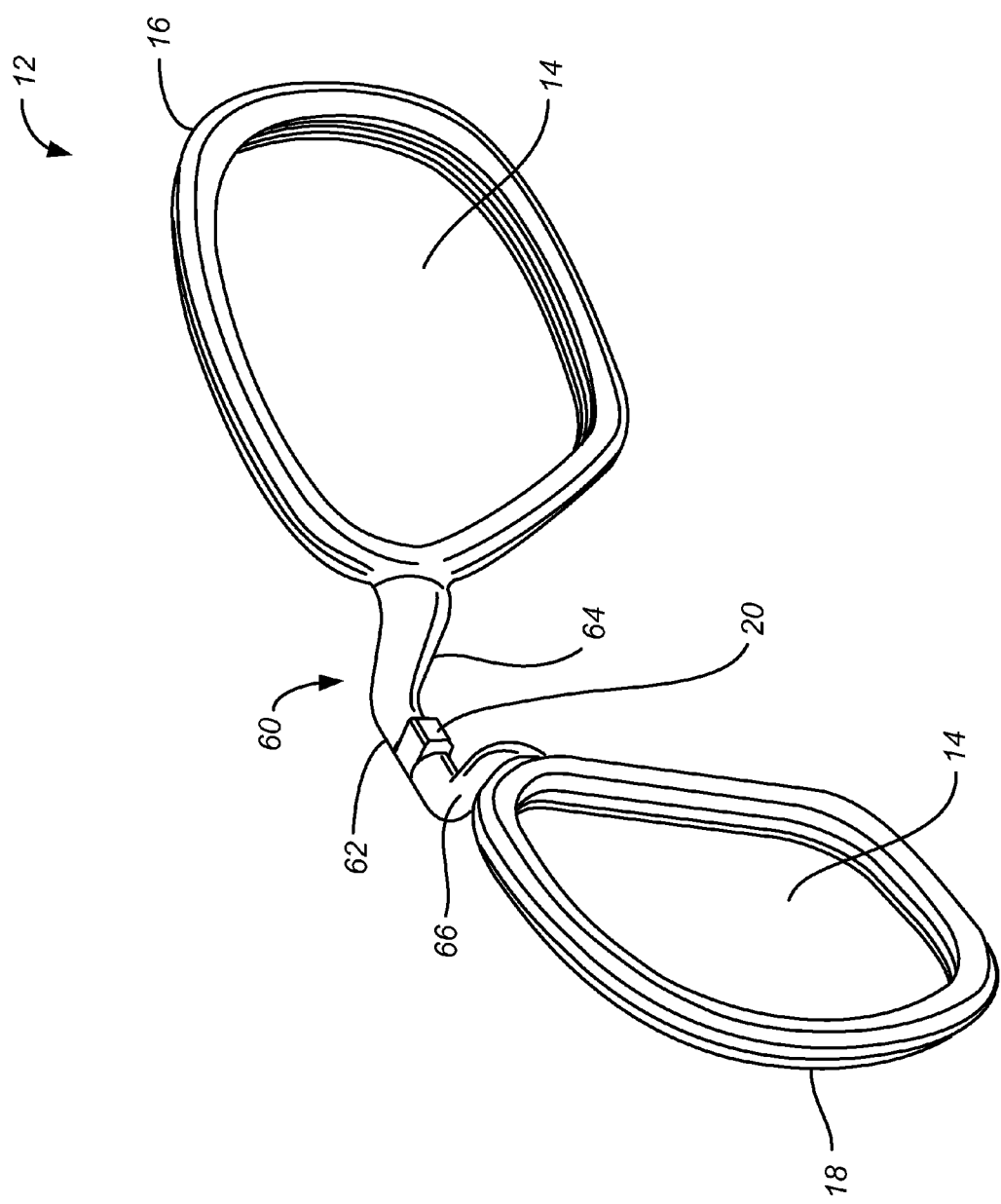
FIG. 3 is an overall, forwardly directed view of the lens frame of FIG. 1.

FIG. 3 is an overall, forwardly directed view of an example of lens frame 12. The first and second lens-receiving portions 16, 18 are connected by an offset, generally U-shaped bridge 60. Bridge 60 has a central portion 62 and first and second support arms 64, 66 connecting the central portion to the first and second lens-receiving portions 16, 18. Central portion 62 is positioned forward of the first and second lens-receiving portions 16, 18 by a distance 67. This offset aids positioning lenses 14 rearward of any lenses or other eye shielding structure 68 of eyewear 34. This helps to ensure that lenses are properly positioned with respect to the user's eyes without interference from any eye shielding structure 68 of eyewear 34. In addition, distance 67 can be sufficient to provide an appropriate distance between ballistic type eye shielding structure 68 of eyewear 34 and prescription lenses 14 of Rx assembly 10; this helps to prevent eye shielding structure 68 from contacting prescription lenses 14 after a ballistic or other impact with eye shielding structure 68. In some examples bridge 60 is a generally straight structure with central portion 62 and first and second support arm 64, 66 extending along a straight line so that distance 67 is small or zero.

Central portion 62 of bridge 60 has a rearwardly extending interlocking projection 70. Interlocking projection 70, in this example, has the same basic rectangular cross-sectional shape as opening 56 and is sized for a snug side to side fit within opening 56. With interlocking projection 70 releasably engaged within opening 56 in rear element 40, rotation of lens frame 12 about a front to rear axis passing through interlocking projection 70 and opening 56, that is a side-two-side rocking motion, is substantially restricted. In this example the vertical height of opening 56 is only slightly larger than the vertical height of interlocking projection 70 to permit the engagement of the interlocking projection within the opening in the manner discussed below. Significant rotation, such as more than about plus or minus 7°, of lens frame 12 about a horizontal axis extending along central portion 62 is substantially prevented by the engagement of interlocking projection 70 with the upper and lower surfaces 74, 76 of rear element 40, which partially define opening 56. The lateral width of the front and rear elements 38, 40 is sufficiently large, combined with the snug fit of center portion 62 within lower portion 48B, substantially inhibits rotation of lens frame 12 about a vertical axis passing through the center of central portion 62.

Figure 4A:
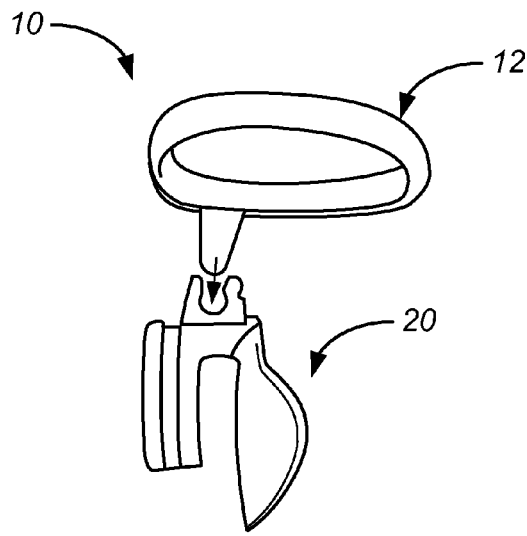
FIGS. 4A-4D illustrate an example of steps used to the mount lens frame of FIG. 3 to the connector of FIG. 2.
Figure 4B:
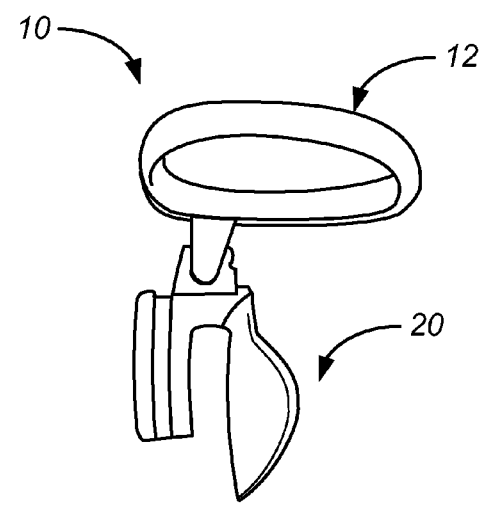
Figure 4C:
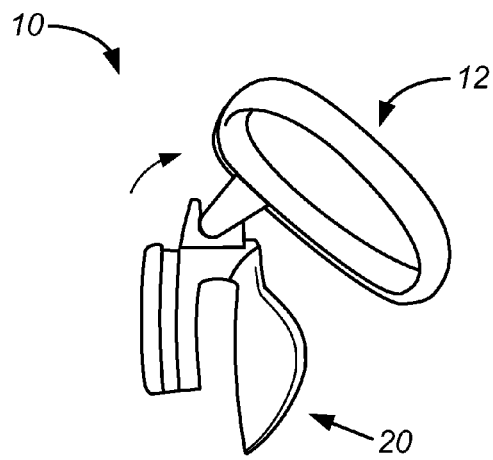
Figure 4D:
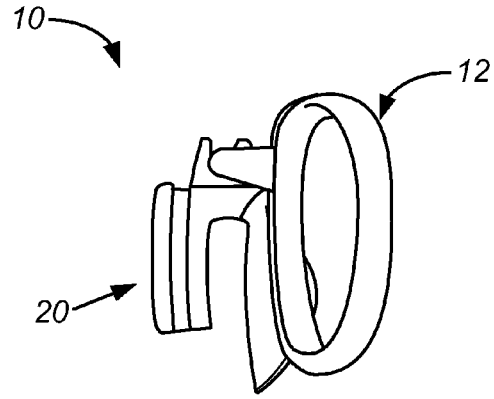
Figure 5:
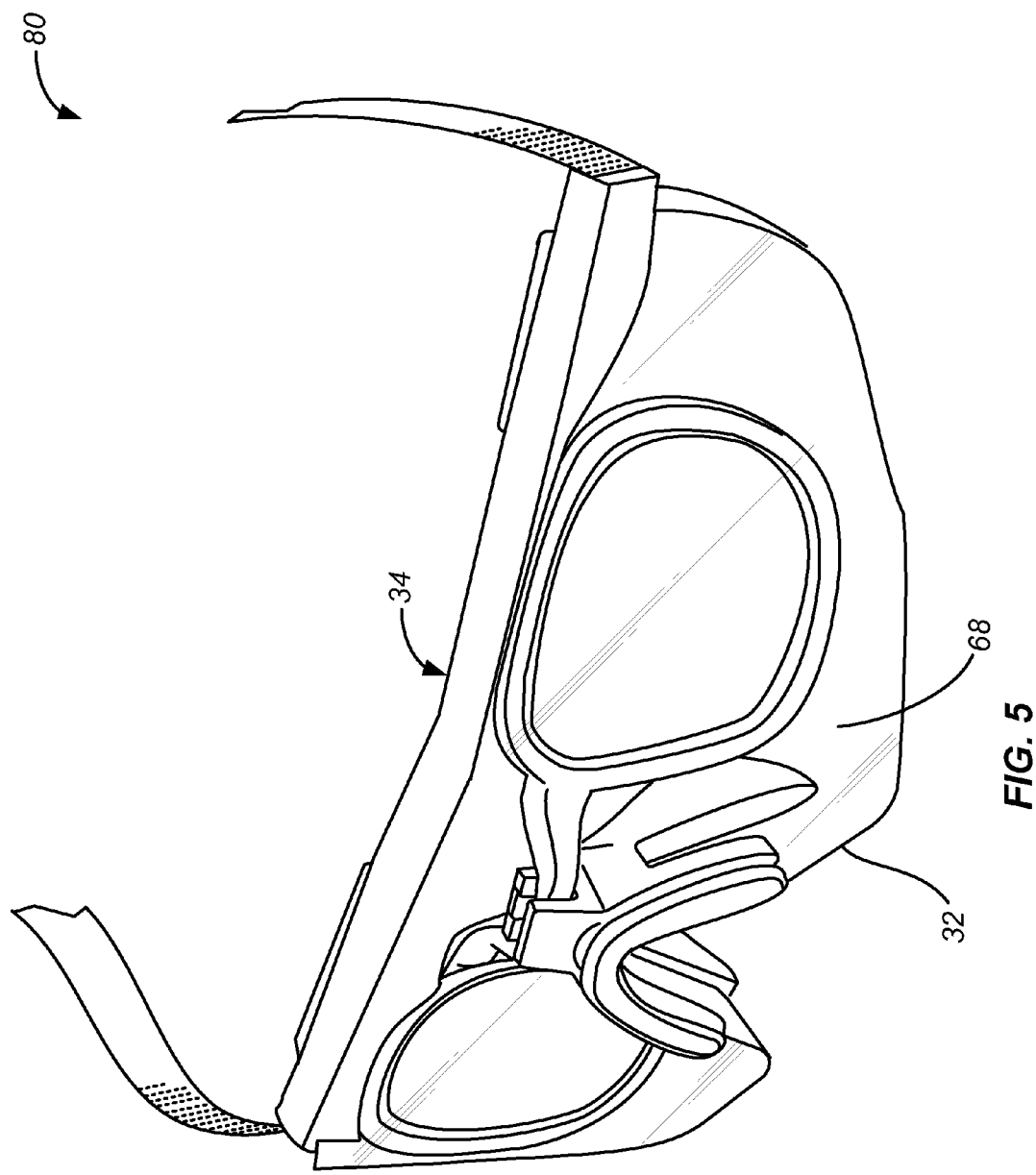
FIG. 5 shows the prescription eyewear assembly of FIG. 1 mounted to eyewear to create an eyewear/prescription eyewear combination.

FIGS. 4A-4D illustrate an example of the steps used to mount lens frame 12 to connector 20. In FIG. 4A lens frame 12 is oriented so that the lens receiving portions 16, 18 are generally horizontal so that interlocking projection 70 extends vertically upwardly. This permits central portion 62 of offset bridge 60 to be inserted down between front and rear elements 38, 40. Except for interlocking projection 70, central portion 62 is generally cylindrical with a diameter slightly larger than dimension 54, which is the separation between front and rear surfaces 42, 44. Front and rear elements 38, 40 are resilient allowing central portion 62 to pass into the semi cylindrical region of channel 50 defined by base surface 48. After central portion 62 is fully seated within the semi cylindrical region of channel 50, see FIG. 4B, lens frame 12 is pivoted downwardly and rearwardly as indicated in FIG. 4C. This causes interlocking projection 70 to engage an upper portion 72, see FIG. 2A, causing rear element 40 to deflect permitting interlocking projection 70 to snap into opening 56. This position is shown in FIG. 4D.

FIG. 5 shows assembly 10 mounted to eyewear 34, with groove 30 engaging central bridge portion 32 of eyewear 34, to create an eyewear/prescription eyewear combination 80. In this example eyewear 34 is a protective goggles type of eyewear with ballistic type eye shield structure 68 to protect the wearer from many types of flying objects. Eyewear connection element 28 would be constructed differently when RX assembly 10 is use with other types of eyewear 34, such as a gas mask.

The above descriptions may have used terms such as above, below, top, bottom, over, under, et cetera. These terms may be used in the description and claims to aid understanding-what is being disclosed and not used in a limiting sense.

While implementations of the technology is disclosed by reference to the preferred embodiments and examples detailed above, it is to be understood that these examples are intended in an illustrative rather than in a limiting sense. It is contemplated that modifications and combinations will occur to those skilled in the art, which modifications and combinations will be within the spirit of the technology disclosed and the scope of the following claims.

Any and all patents, patent applications and printed publications referred to above are incorporated by reference.

What is claimed is:

1. A prescription eyewear assembly, for use with eyewear, comprising:
   a connector;
   a lens frame releasably securable to the connector;
   the connector comprising a front portion and a rear portion;
   the front portion comprising an eyewear connection element;
   the rear portion comprising a clip having upwardly extending front and rear elements, the front and rear elements having opposed front and rear surfaces;
   the clip defining a laterally extending channel between the opposed front and rear surfaces;
   the rear element defining an opening formed therein, the opening extending from the channel in a rearward direction away from the front element;
   the lens frame comprising first and second lens-receiving portions connected by a bridge;
   the bridge comprising a central portion and first and second support arms connecting the central portion to the first and second lens-receiving portions;

the central portion comprising an interlocking projection; and the central portion configured to fit within the channel of the clip with the interlocking projection releasably engaging the opening in the rear element.

2. The prescription eyewear assembly of claim 1, wherein the connector has an inverted, generally V-shaped groove configured for receipt of a corresponding portion of eyewear with which the prescription eyewear assembly can be used.

3. The prescription eyewear assembly of claim 1, wherein the clip has a base portion having a base surface extending to the opposed front and rear surfaces, the base surface and the front and rear opposed surfaces at least partially defining the laterally extending channel.

4. The prescription eyewear assembly of claim 3, wherein the base surface has an upper portion, joining the front and rear surfaces, and a central portion, a front to rear dimension of the base surface at the central portion being larger than a front to rear dimension of the base surface at the upper portion.

5. The prescription eyewear assembly of claim 4, wherein the base surface is a semi-cylindrical surface.

6. The prescription eyewear assembly of claim 1, wherein the bridge is an offset, generally U-shaped bridge.

7. The prescription eyewear assembly of claim 1, wherein the central portion of the bridge is positioned forward of the first and second lens-receiving portions.

8. The prescription eyewear assembly of claim 1, further comprising prescription lenses mounted to the first and second lens-receiving portions.

9. The prescription eyewear assembly of claim 1, wherein the opening is a through hole formed in the rear element.

10. The prescription eyewear assembly of claim 1, wherein the opening and the interlocking projection are sized and shaped to effectively prevent the interlocking projection from rotating within the opening.

11. The prescription eyewear assembly of claim 1, wherein the opening and the interlocking projection have complementary, non-circular shapes to effectively prevent the interlocking projection from rotating within the opening.

12. The prescription eyewear assembly according to claim 1, further comprising nose pads secured to the connector.

13. The prescription eyewear assembly according to claim 11, wherein the nose pads are flexible members so the nose pads can be positioned to accommodate the bridge of the nose of a user.

14. A prescription eyewear assembly, for use with eyewear, comprising:
a connector;
a lens frame releasably securable to the connector;
the connector comprising a front portion and a rear portion;
the front portion comprising an eyewear connection element;
the rear portion comprising a clip having upwardly extending front and rear elements, the front and rear elements having opposed front and rear surfaces;
the clip defining a laterally extending channel between the opposed front and rear surfaces;
the rear element defining an opening formed therein, the opening extending from the channel in a rearward direction away from the front element;
the clip having a base portion with a base surface extending to the opposed front and rear surfaces, the base surface and the front and rear opposed surfaces at least partially defining the laterally extending channel;
the base surface having an upper portion, joining the front and rear surfaces, and a central portion, a front to rear dimension of the base surface at the central portion being larger than a front to rear dimension of the base surface at the upper portion,
the lens frame comprising first and second lens-receiving portions connected by an offset, generally U-shaped bridge;
prescription lenses mounted to the first and second lens-receiving portions;
the bridge comprising a central portion and first and second support arms connecting the central portion to the first and second lens-receiving portions;
the central portion of the bridge being positioned forward of the first and second lens-receiving portions;
the central portion comprising an interlocking projection;
the central portion configured to fit within the channel of the clip with the interlocking projection releasably engaging the opening in the rear element; and
the opening and the interlocking projection being sized and shaped to effectively prevent the interlocking projection from rotating within the opening.

15. The prescription eyewear assembly of claim 14, wherein:
the connector has an inverted, generally V-shaped groove configured for receipt of a corresponding portion of eyewear with which the prescription eyewear assembly can be used;
the base surface is a semi-cylindrical surface;
the opening is a through hole formed in the rear element; and
the opening and the interlocking projection have complementary, non-circular shapes to effectively prevent the interlocking projection from rotating within the opening; and further comprising:
nose pads secured to the connector, the nose pads being flexible members so the nose pads can be positioned to accommodate the bridge of the nose of a user.

16. An eyewear/prescription eyewear combination, comprising:
eyewear comprising a connection portion;
a prescription eyewear assembly comprising:
a connector;
a lens frame releasably secured to the connector;
the connector comprising a front portion and a rear portion;
the front portion comprising an eyewear connection element;
the eyewear connection element comprising a central bridge portion-receiving groove, the eyewear mounted to the connector with the central bridge portion of the eyewear mounted within the central bridge portion-receiving groove;
the rear portion comprising a clip having upwardly extending front and rear elements, the front and rear elements having opposed front and rear surfaces;
the clip defining a laterally extending channel between the opposed front and rear surfaces;
the rear element defining an opening formed therein, the opening extending from the channel in a rearward direction away from the front element;
the lens frame comprising first and second lens-receiving portions connected by a bridge;
the bridge comprising a central portion and first and second support arms connecting the central portion to the first and second lens-receiving portions;
the central portion of the bridge comprising an interlocking projection; and the central portion of the bridge configured to fit within the channel of the eyewear connector with the interlocking projection releasably engaging the opening in the rear element; and the eyewear connection element mounted to the connection portion of the eyewear thereby mounting the prescription eyewear assembly to the eyewear creating an eyewear/prescription eyewear combination.

17. The combination of claim 16, wherein the eyewear comprises protective goggles comprising protective eye shield structure, the protective eye shield structure forming the connection portion.

\* \* \* \* \*